G. C. BROWER.
Gas Torch.
No. 28,556. Patented June 5, 1860.
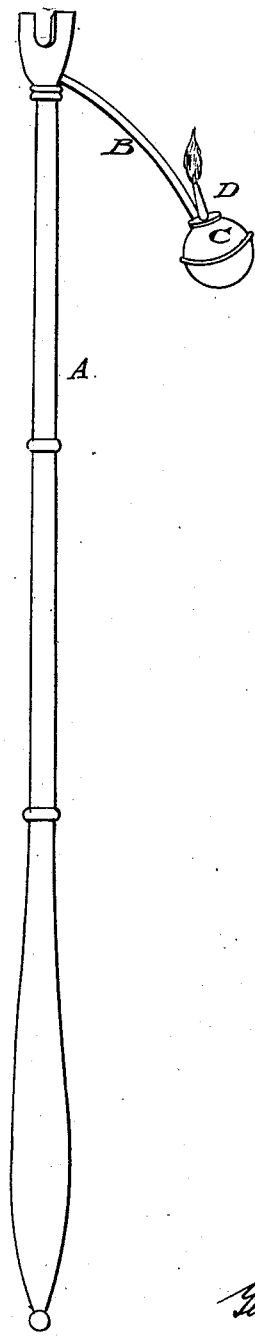

UNITED STATES PATENT OFFICE.

GEORGE C. BROWER, OF NEW ORLEANS, LOUISIANA.

GAS-TORCH.

Specification of Letters Patent No. 28,556, dated June 5, 1860.

*To all whom it may concern:*

Be it known that I, GEORGE CLINTON BROWER, of New Orleans, in the State of Louisiana, have invented an Improvement in Spirit-Torches for Lighting Gas; and I do hereby declare that the following is a full and exact description thereof, reference being had to the accompanying drawing and to the letters of reference marked thereon.

My improvement consists in placing a reservoir for alcohol at the outer end of a crook (or branch from the staff) made to pass into the top of the gas shade, thereby avoiding the difficulties of the bent torches heretofore used, where the wick tube, forming the crook, is necessarily too long to permit a steady supply of spirits, which is at one moment in excess, dangerously dripping from the wick, and the next entirely deficient, allowing the wick to be burned off close, when it is very troublesome to draw it out so as to be relighted, and requiring considerable time to draw a fresh supply from the distant reservoir.

To enable others to make and use my improvement, I will proceed to describe its construction.

A is a wooden staff with a key at the end to turn the taps.

B is a branch made of wire or tubing, projecting downward toward the handle.

C is a globular reservoir for spirits attached to the end of B.

D is an ordinary wick tube projecting upward from C. This wick tube may be very small to economize spirits, as its nearness to the source of supply renders large wick unnecessary.

The branch B may be made to serve as a feeder from a larger reservoir placed in the staff, though as this increases weight it is not generally desirable.

I do not claim the gas key nor the spirit torch nor generally the combination.

What I do claim as my invention and desire to secure by Letters Patent is—

A gas torch constructed substantially as described and represented.

GEO. C. BROWER.

Witnesses:
 THEO. IORDY,
 MYFORD McDOUGALL.